United States Patent
Niu et al.

(10) Patent No.: US 8,929,268 B2
(45) Date of Patent: Jan. 6, 2015

(54) TECHNIQUES FOR HIERARCHICAL ENCODING FOR MULTICAST BROADCAST SERVICES IN WIRELESS COMMUNICATION SYSTEMS

(75) Inventors: Huaning Niu, Milpitas, CA (US);
Yujian Zhang, Beijing (CN);
Changlong Xu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/456,568

(22) Filed: Jun. 17, 2009

(65) Prior Publication Data

US 2010/0322129 A1  Dec. 23, 2010

(51) Int. Cl.
*H04H 20/71* (2008.01)
*H04W 4/00* (2009.01)
*H04L 27/34* (2006.01)

(52) U.S. Cl.
CPC .................................. *H04L 27/3488* (2013.01)
USPC ........................................... 370/312; 370/329

(58) Field of Classification Search
CPC .... H04L 47/15; H04L 47/806; H04L 61/2069
USPC .................. 370/312, 328, 529, 535, 537, 542
See application file for complete search history.

(56) References Cited

U.S. PATENT DOCUMENTS

| | | |
|---|---|---|
| 2006/0195752 A1 | 8/2006 | Walker et al. |
| 2007/0195907 A1 | 8/2007 | Wang et al. |
| 2007/0250638 A1 | 10/2007 | Kiran et al. |
| 2009/0028105 A1* | 1/2009 | Schaepperle ................. 370/329 |

FOREIGN PATENT DOCUMENTS

| | | |
|---|---|---|
| CN | 1666442 A | 9/2005 |
| CN | 101052139 A | 10/2007 |
| CN | 101355477 A | 1/2009 |
| CN | 102461166 A | 5/2012 |
| EP | 2443832 A2 | 3/2012 |
| JP | 8-506473 T | 7/1996 |
| JP | 2006-261982 A | 9/2006 |
| JP | 2008-533820 A | 8/2008 |
| KR | 10-2008-0109812 A | 12/2008 |
| KR | 20080109812 A | 12/2008 |
| TW | 201119394 A | 6/2011 |
| WO | 95/16314 A2 | 6/1995 |
| WO | 20061096680 A1 | 9/2006 |
| WO | 2009/039638 A1 | 4/2009 |
| WO | 2009039638 A1 | 4/2009 |
| WO | 2010/147755 A2 | 12/2010 |
| WO | 2010/147755 A3 | 2/2011 |

OTHER PUBLICATIONS

International Search Report and Written Opinion received for PCT Patent Application No. PCT/US2010/036823, mailed on Dec. 15, 2010, 10 pages.

(Continued)

*Primary Examiner* — Brandon Renner
(74) *Attorney, Agent, or Firm* — Thorpe North & Western LLP

(57) ABSTRACT

An embodiment of the present invention provides an apparatus, comprising a transceiver adapted for hierarchical encoding for a Multicast Broadcast Service (MBS) in wireless networks, wherein the hierarchical encoding is provided by superposition coding to provide different levels of protection for data streams.

10 Claims, 5 Drawing Sheets

(56) References Cited

OTHER PUBLICATIONS

Tahir et al., "Unequal error protection for wireless data transmission using superposition coding with feedback", International conference on Innovations in Information Technology, 2008, Dec. 16-18, 2008, pp. 426-429.

Wang et al., "System Architecture and Cross-Layer Optimization of Video Broadcast over WiMAX", IEEE Journal on Selected Areas in Communications, vol. 25, Issue: 4, May 2007, pp. 712-721.

Office Action received for Chinese Patent Application No. 201080027690.X mailed on Nov. 8, 2013, 17 Pages of Office Action Including 11 pages of English Translation.

Office Action received for Japanese Patent Application No. 2012-516106 mailed on Jan. 7, 2014, 4 pages of Office Action Including 2 pages of English Translation.

Office Action received for Korean Patent Application 10-2011-7030163, mailed on Dec. 11, 2012, 2 pages of English translation only.

International Preliminary Report on Patentability received for PCT Application No. PCT/US2010/036823, mailed on Jan. 5, 2012, 7 pages.

Tahir, Y., et al., "Innovations in Information Technology", Dec. 16-18, 2008, Abstract Only, 1 pg.

Jianfeng, W., et al., Communications, IEEE Journal, "System Architecture and Cross-Layer Optimization of Video Broadcast over WiMAX", vol. 25, No. 4, May 2007, 10 pgs.

International Search Report and Written Opinion mailed Dec. 15, 2010 for International Serial No. PCT/US/2010/036823, 8 pages.

Office Action received for Taiwanese Patent Application No. 099117013, mailed on Apr. 29, 2013, 12 pages of Office Action including 5 pages of English translation.

Office Action received for Japanese Patent Application No. 2012-516106, mailed on Mar. 26, 2013, 8 Pages of Office Action including 4 pages of English translation.

\* cited by examiner

TECHNIQUES FOR HIERARCHICAL ENCODING FOR MULTICAST BROADCAST SERVICES IN WIRELESS COMMUNICATION SYSTEMS

BACKGROUND

Hierarchical encoding is widely supported in current broadcast standards. In broadcast systems, the capacity is typically limited by the worst user in the coverage area. By using hierarchical encoding, users with a limited signal to noise ratio (SNR) may only receive low quality video. Users with high SNR may take advantage of hierarchical encoding to receive high quality. Therefore, overall MBS capacity is improved.

Current techniques supporting hierarchical encoding by layered modulation is limited in single input single output (SISO) transmissions. For example, the 16 QAM constellation used in DVB-T has 3 formats, one non-layered constellation, and two layered constellations for hierarchical encoding as shown in FIG. 1 at 100 and FIG. 2 at 200. FIG. 1 depicts a first 110 layered 16 QAM modulation format in DVB-T and FIG. 2 depicts a second 210 layered 16 QAM modulation format in DVB-T; A similar layered constellation is also defined in the MediaFLO standard, where only the scale of the constellation is changed slightly. The layered constellation provides an essential improvement for broadcast services. The limitations are (1) only two level of adaptation is available as defined in both DVB-T and MediaFLO; and (2) it can only be used in single transmit antenna case.

Thus, a strong need exists for improved techniques for hierarchical encoding for multicast broadcast services in wireless communication systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
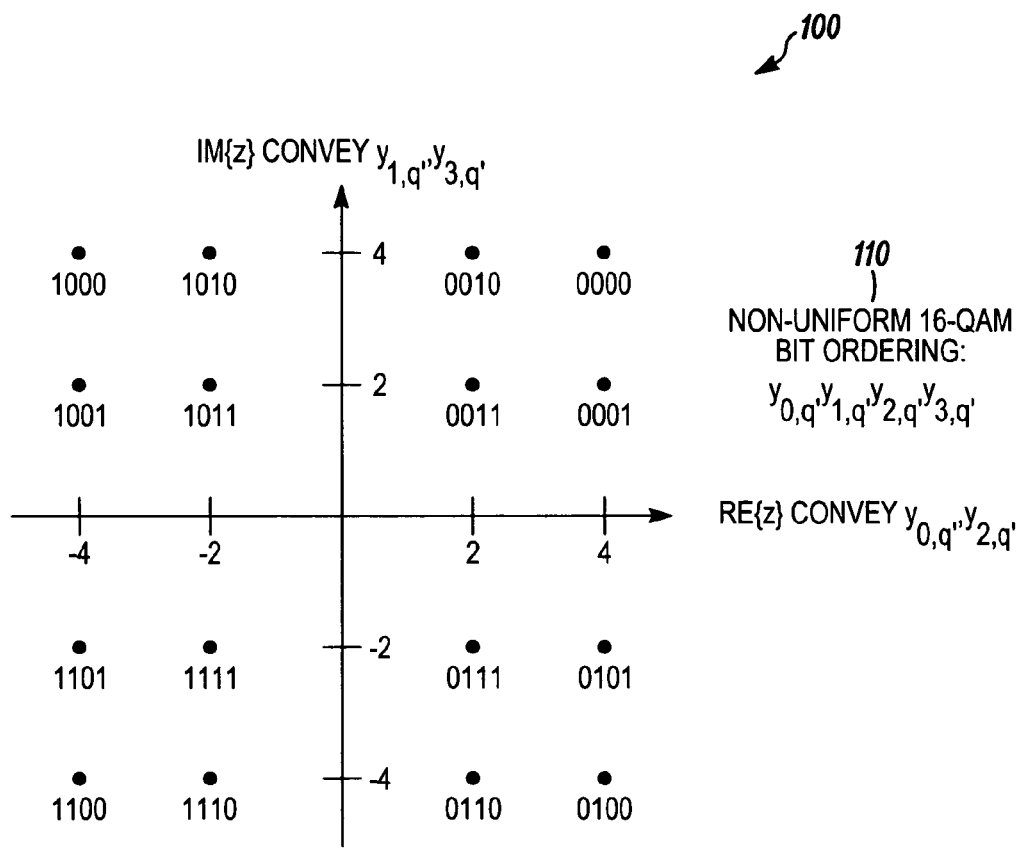
FIG. 1 depicts a layered 16 QAM modulation format 1 in DVB-T.
Figure 2:
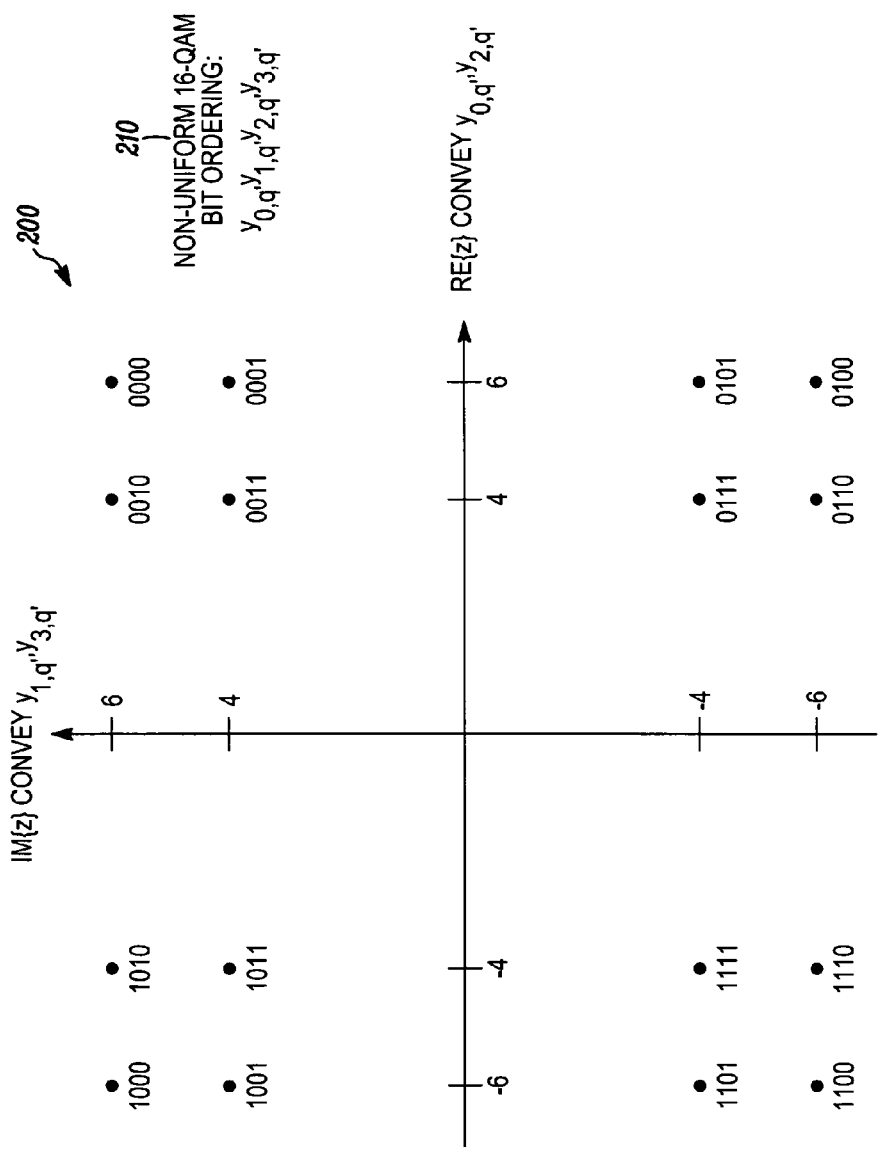
FIG. 2 depicts a layered 16 QAM modulation format in DVB-T.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Layered modulation is a special case of superposition coding in general. Superposition coding is proved to achieve broadcast capacity comparing to TDM and FDM and is a scheme for multiplexing a broadcast service and a unicast service. However there are several limitations on MBS/Unicast superposition coding, such as: (1) higher cost for devices with unicast service only; (2) large buffer and long delay for unicast service as MBS transmission period is typically longer; and (3) large pilot overhead overall as MBS and unicast service require different pilots etc.

Embodiments of the present invention provide using superposition coding to provide different levels of protection for data streams, such as MPEG streams. Although the present invention is not limited in this respect.

Embodiments of the present invention provide a scheme based on superposition coding to support hierarchical encoding in wireless networks, such as a network that operates in compliance with the Institute for Electronics and Electrical Engineers (IEEE) 802.16m MBS network. The present invention may use the large variance of the signal to interference noise ratio (SINR) distribution within the network. Embodiments of the present invention may transmit the high priority bits with greater power, and the low priority bits with less power from a base station (BS). For users that are far away from a base station with limited SINR, it will decode the high priority stream only. The low priority bits are considered as noise, which is much lower than the noise floor and therefore does not degrade the performance. For good users with high SINR, it can decode the high priority stream first, in which case the main noise source is the low priority stream. The high priority stream is then cancelled from the transmission, and the low priority stream is decoded with high reliability due to the high SINR level.

Figure 3:
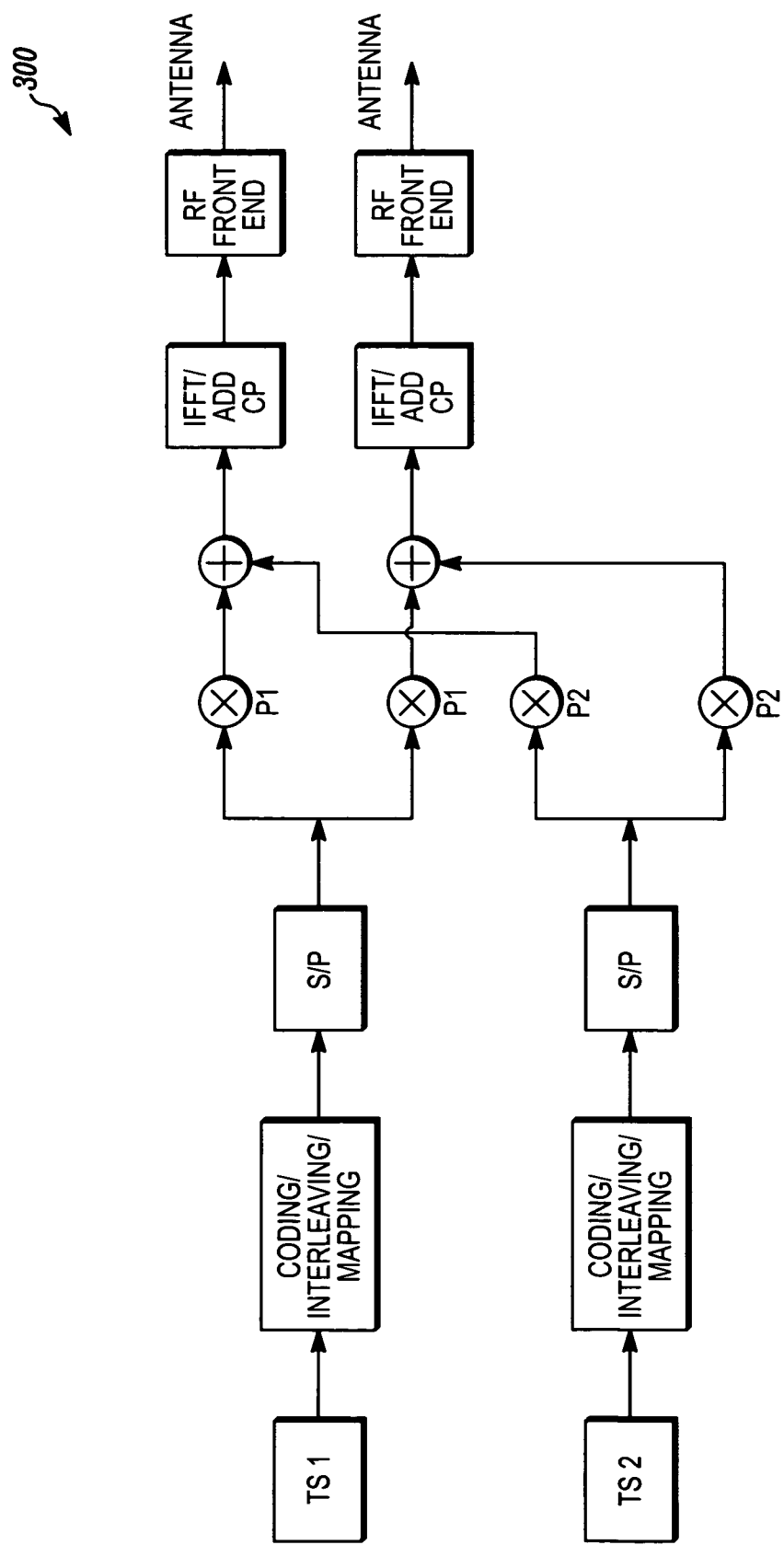
FIG. 3 depicts a transmit diagram with hierarchical encoding according to an embodiment of the present invention.
Figure 4:
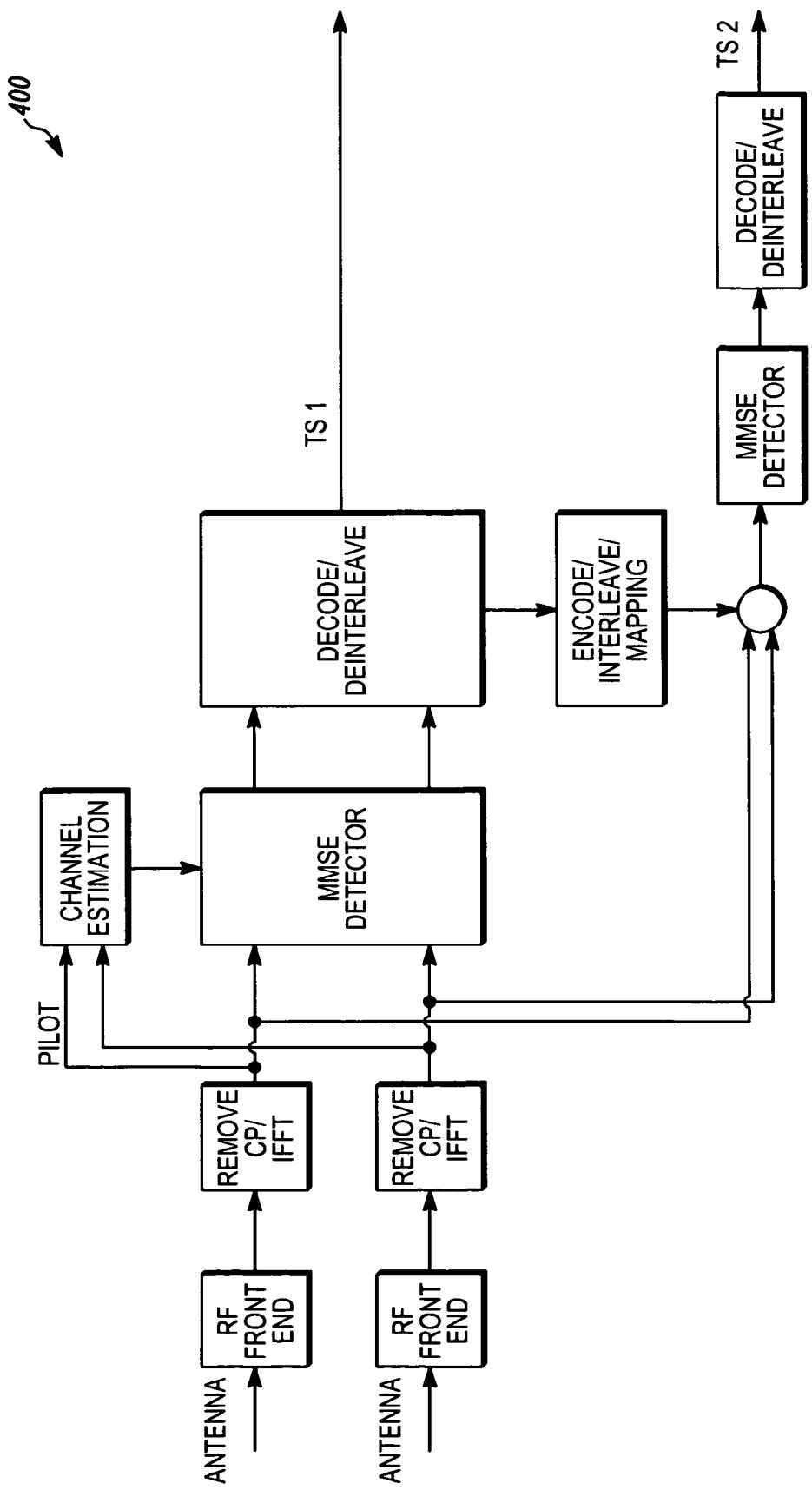
FIG. 4 depicts a receive diagram with interference cancellation for good SNR users according to an embodiment of the present invention.
Figure 5:
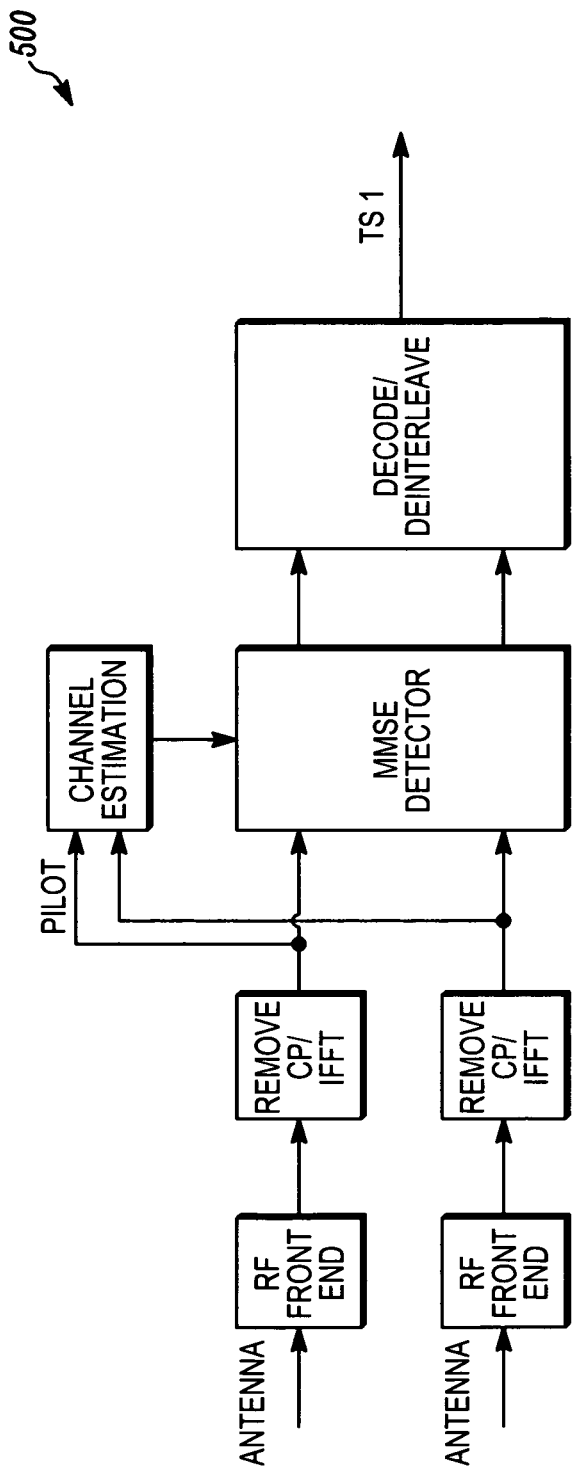
FIG. 5 illustrates a receive diagram for bad SNR users according to an embodiment of the present invention.

Looking now at FIG. 3, shown generally as 300, is a block diagram for the transmit side. The receive (Rx) diagram for good users with high SINR is shown in FIG. 4 at 400. With interference cancellation, the good users can receive both the important stream and the less important stream to achieve high video quality. A typical receive diagram for bad users with low SINR is shown in FIG. 5 at 500. Only the high priority stream is received and therefore a lower quality video.

Embodiments of the present invention have several main advantages over the layered modulation method: (1) It does not limit to just two levels of hierarchical protection. By adjusting the power level of the high priority stream and low priority stream, multiple levels of hierarchical protection are achieved. (2) It can be used with MIMO transmissions, which is a key requirement in the IEEE 802.16m deployment. (3) The high priority stream and low priority stream length can be very flexible based on application and source codec, as the coding/modulation for each priority stream is specified separately.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A system, comprising:
a transceiver configured to perform superposition encoding for a Multicast Broadcast Service (MBS) in wireless networks, wherein said superposition encoding is provided by transmitting high priority bits with a power level to form a high priority stream, and low priority bits with a lower power level than the high priority bits to form a low priority stream that provides different levels of protection for data streams, wherein said low priority stream is not decoded when a signal to interference noise ratio (SINR) is less than a selected level and the low priority stream is configured to be used with the high priority stream when the SINR is greater than the selected level.

2. The system of claim 1, wherein said transceiver is operated as a base station that is operable for communication with mobile stations (MSs) and wherein MSs that are a selected distance from said base station with a signal to interference noise ratio (SINR) that is less than a selected level will decode said high priority stream only and said low priority stream is considered noise.

3. The system of claim 2, wherein for MSs with a high SINR that is greater than the selected level, said base station decodes said high priority streams first, in which case a main noise source is said low priority stream, and said high priority stream is then cancelled from transmission, and said low priority stream is decoded with high reliability due to the high SINR that is greater than the selected level.

4. A method, comprising:
using superposition encoding by a transceiver configured to perform a Multicast Broadcast Service (MBS) in wireless networks, wherein said superposition encoding provides different levels of protection for a data streams by transmitting high priority bits in the data stream with a power level to form a high priority stream, and low priority bits in the data stream with a lower power level than the high priority bits to form a low priority stream, wherein said low priority stream is configured to not be decoded when a signal to interference noise ratio (SINR) is less than a selected level and the low priority stream is configured to be used with the high priority stream when the SINR is greater than the selected level.

5. The method of claim 4, further comprising operating said transceiver as a base station for communication with mobile stations (MSs) and wherein MSs that that are a selected distance from said base station with a signal to interference noise ratio (SINR) less than a selected level will decode a high priority stream only and a low priority stream is considered noise.

6. The method of claim 5, wherein for MSs with a high SINR that is greater than the selected level, said base station decodes high priority streams first, in which case a main noise source is said low priority stream, and said high priority stream is then cancelled from transmission, and said low priority stream is decoded with high reliability due to a high SINR level.

7. A non-transitory computer readable medium encoded with computer executable instructions, which when accessed, cause a machine to perform operations comprising:
controlling encoding by a transceiver configured to perform a Multicast Broadcast Service (MBS) in wireless networks, wherein said hierarchical encoding is provided by superposition coding to provide different levels of protection for a data stream by transmitting high priority bits in the data stream with a power level to form a high priority stream, and low priority bits in the data stream with a lower power level than the high priority bits to form a low priority stream, wherein said low priority stream is configured to not be decoded when a signal to interference noise ratio (SINR) is less than a selected level and the low priority stream is configured to be used with the high priority stream when the SINR is greater than the selected level.

8. The computer readable medium encoded with computer executable instructions of claim 7, further comprising additional instruction that provide operating said transceiver as a base station in said wireless network and transmitting high priority bits at a power level, and low priority bits with a lower power level than the high priority bits.

9. The computer readable medium encoded with computer executable instructions of claim 8, further comprising additional instruction that provide operating said base station for communication with mobile stations (MSs) and wherein MSs that are a selected distance from said base station with limited a signal to interference noise ratio (SINR) less than a selected level will decode a high priority stream only and a low priority stream is considered noise.

10. The computer readable medium encoded with computer executable instructions of claim 9, wherein for MSs with a high SINR that is greater than the selected level, said base station decodes high priority streams first, in which case a main noise source is said low priority stream, and said high priority stream is then cancelled from transmission, and said low priority stream is decoded with high reliability due to a high SINR level.

* * * * *

UNITED STATES PATENT AND TRADEMARK OFFICE
CERTIFICATE OF CORRECTION

| | | |
|---|---|---|
| PATENT NO. | : 8,929,268 B2 | Page 1 of 1 |
| APPLICATION NO. | : 12/456568 | |
| DATED | : January 6, 2015 | |
| INVENTOR(S) | : Huaning Niu et al. | |

It is certified that error appears in the above-identified patent and that said Letters Patent is hereby corrected as shown below:

In the Specification

Column 1, line 6, Please add a paragraph at the beginning of the specification with a subheading "CLAIM OF PRIORITY" as follows:

This application claims the benefit under 35 U.S.C. § 119(3) of U.S. Provisional application filed on September 4, 2008 in the U.S. Patent and Trademark Office and assigned Serial No. 61/094,357.

Signed and Sealed this
Thirteenth Day of October, 2015

Michelle K. Lee
*Director of the United States Patent and Trademark Office*